Patented Oct. 1, 1935

2,016,026

UNITED STATES PATENT OFFICE 2,016,026

PLASTIC, ELASTIC MATERIAL AND PROCESS OF MAKING THE SAME

Seaphes D. Shinkle, Passaic, N. J., assignor, by mesne assignments, to United States Rubber Company, New York, N. Y., a corporation of New Jersey No Drawing. Application August 18, 1933, Serial No. 685,739. In Canada September 23, 1932

27 Claims. (Cl. 260—2)

This invention relates to new plastic, elastic materials, processes of making the same, and to compositions of matter comprising said materials. The invention relates more specifically to the plastic, elastic products of the reactions between ethylene dihalide and a group of aromatic hydrocarbons including benzene and certain of its homologues.

It is known that a careful heating of a mixture of xylene and ethylene chloride in the presence of aluminum chloride yields oily bodies and that a stronger heating gives resinous substances which may be kneaded when hot but which harden on cooling. The condensation products of these reactions are either viscous oils or resinous solids.

I have discovered that if an ethylene dihalide, in certain molar proportions, is allowed to react in the presence of a small amount of aluminum chloride with an aromatic compound having the general formula R—$C_6H_4$—R', wherein R and R' each represent hydrogen or a saturated aliphatic hydrocarbon radical containing more than one carbon atom, products may be obtained that are plastic and elastic at ordinary and higher temperatures. These products are flexible, infusible, heat resistant, and are substantially insoluble in and unaffected by water, acids, alkalis, and many organic liquids. They are also characterized by high electrical resistance. These products may be sheeted out on a mill, may be intermixed with fillers, pigments, and the like, and may be blended readily with rubber and like materials. The reaction may be carried out in the presence of rubber. The products may be readily dispersed in water or in organic solvents.

In preparing these new products, one mol of an aromatic compound having the general formula R—$C_6H_4$—R', wherein R and R' each represent hydrogen or a saturated aliphatic hydrocarbon radical containing more than one carbon atom, examples of which are benzene, ethyl benzene, diethyl benzene, isopropyl benzene (cumene), butyl benzene is treated with one to three mols of an ethylene dihalide (symmetrical) in the presence of aluminum chloride or its equivalent, and the reaction allowed to proceed until gellation occurs, and thereafter the reaction is stopped and the product recovered. When an aromatic hydrocarbon of the class described is treated with an ethylene dihalide such as ethylene chloride, in the presence of a small amount of aluminum chloride, a smooth reaction takes place with the evolution of hydrogen chloride during which there is a marked increase in the viscosity of the reaction mixture. When the reaction has proceeded to a certain point, the entire liquid reaction mixture swells to several times its original volume and is converted into a jelly-like mass. The reaction may thereafter be stopped and the product substantially freed from aluminum salts, by treating or washing the mass with water, preferably containing a small amount of acid such as hydrochloric acid or alkali such as sodium hydroxide, and finally with water. In order to facilitate the washing operation, the jelly may be disintegrated by mechanical and/or by other means. I have found that the addition to the reaction mixture just prior to the washing treatment of a small quantity of an organic solvent such as butylacetate, together with a mechanical disintegration, effects rapidly the breaking up of the gel structure and produces a mass of finely divided jelly-like particles. I may if desired pass steam through the mixture during the washing operation, thereby effecting the removal of any unreacted hydrocarbon or ethylene dihalide. The resulting product is a spongy mass of elastic particles, which may be separated from the water and dried. Drying may be effected by heating at an elevated temperature, for example at 70° to 100° C., under vacuum if desired, thereby removing residual water, volatile hydrocarbon and ethylene dihalide, or the product may first be partially dried by squeezing, as by passing the material repeatedly through the rolls of a rubber mill. When so milled the particles coalesce to form a smooth continuous sheet. When the products are heated in the presence of water as in the washing and steaming operations they become lighter in color; when they are worked on a cold mill the color remains unchanged. When the products are heated substantially in the absence of water as in hot air, or when worked on a hot mill at temperatures below about 200° C., the products become dark in color, but are otherwise unchanged by the heat.

In carrying out this process to produce the desired plastic, elastic products, it is necessary that the reaction be stopped a suitable interval after gel formation has occurred; the higher the reaction temperature, the more quickly must the reaction be stopped. If the reaction is allowed to proceed too long after gellation occurs, the material resulting from quenching the reaction with water is found to consist of discreet non-flocculent granules of a hard infusible resin having no plastic properties. If the reaction is stopped while the reaction mixture is still in the viscous liquid stage and before gellation occurs, only viscous oil is obtained, which in the case of the reaction with benzene contains substantial proportions of sym-diphenyl ethane formed by the reaction of two mols of benzene with one mol of ethylene dihalide.

In view of the presence of sym-diphenyl ethane during the earlier stages of the reaction between benzene and ethylene dihalide, and of its substantial absence in the final product, it is evident that the diphenyl ethane formed reacts further with ethylene dihalide to form the more complex products of the invention. It is obvious that diphenyl ethane, or other lower intermediate products of the reaction of an aromatic hydrocarbon of the general formula R—C$_6$H$_4$—R' above described with ethylene dihalide in the presence of aluminum chloride, may be employed instead of benzene or the other above referred to hydrocarbons as the starting material in the process of the invention, the proportion of ethylene dihalide being adjusted accordingly, as shown in Example 6 below. These lower intermediate products vary from the hydrocarbons of the general formula R—C$_6$H$_4$—R' above described, only in that benzene or homologues thereof containing one or two side chains having more than one carbon atom in each chain are attached to the R and/or R' radicals when such radicals represent the saturated aliphatic hydrocarbon radicals of the general formula. In this manner the one step process of, for example, reacting benzene with ethylene chloride to form the new plastic, elastic material may be made a two step process of first reacting benzene with ethylene chloride to form sym-diphenyl ethane and then reacting the diphenyl ethane with ethylene chloride to form the plastic, elastic material of this invention. Of course, if diphenyl ethane is used as a starting material to react with the ethylene dihalide to form the new products it may be made in any desired manner.

When the molar proportion of ethylene dihalide to benzene hydrocarbon employed is substantially greater than one to one, as illustrated in Examples 1 to 7 hereinafter, the interval after which the reaction should be quenched following the formation of a gel is on the order of a few minutes, if the production of the desired plastic, elastic material is to be assured. With the use of the reactants in the molar proportion of substantially one to one, however, the required interval between gellation and quenching is less critical and becomes extended to a few hours, greatly reducing the likelihood of error in fixing the proper end-point of the reaction; the reaction is also more readily kept under control. Hence the use of equimolecular proportions is particularly advantageous, as illustrated by Example 8 hereinafter.

If substantially less than one molar proportion of ethylene dihalide is used, no gel is formed and only an oily product is obtained. As the molar proportion of ethylene dihalide is increased over the range from two to about three mols, all of the resulting products are substantially identical in their properties, and contain ethylene and benzene groups condensed substantially in the ratio of two to one. Thus, when one mol of benzene is treated with three mols of ethylene chloride, about one mol of ethylene chloride is recovered during the subsequent steaming. If substantially more than three molar proportions of ethylene dihalide are used, gellation occurs but undesirable side-reactions also take place and only hard resinous substances having no plastic or elastic properties are obtained.

The reaction is of the type wherein the aluminum chloride may be employed in a lesser molar proportion than that of the aromatic hydrocarbon present. I have found, however, that a minimum amount of aluminum chloride equal to at least about 7% of the weight of the aromatic hydrocarbon is preferable to insure the formation of rubber-like products. Additional quantities of aluminum chloride serve to increase the rate of reaction but do not change the nature of the product.

Other ethylene dihalides (symmetrical) such as ethylene bromide may be employed in the process in place of ethylene chloride. Ethylene dihalides, however, are the only halides I have found which are operative in the process. The following do not yield any plastic, elastic material at all: propylene chloride, iso-butylene bromide, amylene chloride, styrene chloride, trimethylene chloride, pentamethylene chloride, and benzyl chloride. Apparently the reaction is confined to ethylene dihalides.

As has been made clear hereinbefore, the aromatic hydrocarbons which may be employed comprise benzene, and mono and di-alkyl-substituted benzenes in which each alkyl group is saturated and contains more than one carbon atom, such as ethyl benzene, di-ethyl benzene, iso-propyl benzene, butyl benzene. Toluene and xylene may not be substituted for the compounds of the general formula R—C$_6$H$_4$—R', above described, since with ethylene chloride in the presence of aluminum chloride only viscous oils or hard non-plastic resinous substances are produced. Other hydrocarbons that have failed to give the desired products are diphenyl, p-cymene (p-methyl iso-propyl benzene), tetrahydronaphthalene, decahydronaphthalene, cyclohexane, mesitylene (sym-trimethyl benzene), 1, 2, 4-triethyl benzene, diphenyl methane, 1, 2-diphenyl propane, 1, 3-diphenyl propane, fluorene, naphthalene, and anthracene, which substances like toluene and xylene react with ethylene dichloride in the presence of aluminum chloride to give only oils or hard nonplastic resinous substances.

Aluminum chloride may to some extent be replaced by other metallic chlorides of the class employed in carrying out reactions of the Friedel Craft type, but these are much less effective than aluminum chloride. For example ferric chloride reacts much more slowly and zinc chloride has no appreciable action under the conditions employed.

In order to illustrate various ways of carrying out the invention, but without intention to limit the invention except as required by the prior art, the following examples are included:

*Example 1*

Forty pounds of benzene (0.5 lb.-mol), 150 lbs. of ethylene chloride (1.5 lb.-mols) and 10 lbs. of aluminum chloride are charged into a suitable vessel, for example, a jacketed porcelain-lined kettle, equipped with a reflux condenser and a stirrer. The condenser is also connected to an absorbing train for hydrogen chloride. The reaction starts spontaneously, and, as heat is evolved and the temperature rises, it becomes more vigorous. The mixture is stirred continuously. The reaction is controlled by holding the temperature of the mixture at 40–50° C., whereby a steady evolution of hydrogen chloride is maintained. When the reaction has subsided somewhat, which may occur after 20-24 hrs., the temperature is raised to approximately 60°-70° C., for a short time, say about 10 minutes, to hasten the completion of the reaction. The heat supply (steam) is then discontinued. As the reaction proceeds the mixture becomes more viscous, until at a certain point, after a total elapsed time of about 25-30 hrs., the flow of hydrogen chloride nearly ceases. The temperature has meanwhile fallen to 40-50° C. Then within a few minutes the highly viscous mixture swells rapidly to about three times its original volume and is converted into a transparent, jelly-like mass. Then within not more than about ten minutes after the gelling, the mass is treated with one gallon of 36% hydrochloric acid and about 30 gallons of water, in order to stop the reaction and to decompose the aluminum compounds. Stirring is continued for an hour or longer to effect disintegration of the mass. Steam is then blown through the mixture to remove unchanged ethylene chloride and benzol. About 40 lbs. of ethylene chloride are recovered. During the steaming some further swelling of the mass takes place. The resulting plastic, elastic, cream-colored mass is then washed successively, on a washing mill or in a Werner-Pfleiderer mixer or the like, with water, a dilute caustic alkali solution, a dilute soap solution, and finally again with water. The product is then formed into sheets and is dried under vacuum at a temperature of about 70° C. Alternatively, the drying may be effected by passing the product between heated rolls, as on a rubber mill, whereby a smooth, continuous sheet is formed, and completing the drying by heating the material in an oven at about 100-110° C. The final product is a greenish-brown to black material which is plastic at ordinary temperatures and markedly elastic.

If desired, the reaction may be carried on throughout at a temperature of about 70° C., efficient cooling means then being required to prevent the reaction from becoming too violent. At such temperature gelling may occur in from 1½ to 3 hrs. whereupon the reaction should be stopped within about 3 minutes. Immediately before adding the water and acid, the gel may be disintegrated by the addition thereto of a small amount of butyl acetate or the like. The treatments with caustic and with soap may be omitted if desired.

*Example 2.*—The materials employed are:

Ethylene chloride (1 mol) _____ 100 g.
Ethyl benzene (0.5 mol) _____ 53 g.
Aluminum chloride _____ 10 g.

The reaction is carried out in a manner similar to the process of Example 1, except that the reacting materials are heated to about 70° C. immediately after mixing, and the product is washed only with dilute hydrochloric acid and with water. The resulting product is more elastic and much "tackier" than the one obtained from benzene, but is otherwise very similar in its properties.

*Example 3.*—The process of Example 1 may also be carried out in the presence of rubber as an additional ingredient of the reaction mixture, as illustrated in the following example:

Ethylene chloride (1 mol) _____ 100 g.
Pale crepe (unbroken down) _____ 2.5 g.
Benzol (0.5 mol) _____ 40 g.
Aluminum chloride _____ 10 g.

The pale crepe is dissolved in the mixture of ethylene chloride and benzol; the aluminum chloride is then added and the reaction is carried out as in Example 1.

The product formed is tougher than the one produced in Example 1, but is otherwise very similar in its properties.

*Example 4.*—The materials employed are:

Butyl benzene (0.5 mol) _____ 67 g.
Ethylene chloride (1 mol) _____ 100 g.
Aluminum chloride _____ 10 g.

The procedure followed in carrying out the reaction and working up the product is substantially the same as that in Example 2. The product obtained is a plastic, elastic material similar to that of Example 1.

*Example 5.*—The materials employed are:

Diethyl benzene (para isomer) (0.5 mol) __ 67 g.
Ethylene chloride (1 mol) _____ 100 g.
Aluminum chloride _____ 10 g.

The procedure followed is the same as that in Example 2. The product obtained is similar to that of Example 2.

*Example 6.*—The materials employed are:

Ethylene chloride (1 mol) _____ 100 g.
Sym-diphenyl ethane (0.33 mol) _____ 61 g.
Aluminum chloride _____ 10 g.

The process is carried out as in Example 1. The product obtained is substantially identical with the product of Example 1.

*Example 7.*—The materials employed are:

Benzene (0.5 mol) _____ 39 g.
Ethylene dibromide (1.0 mol) _____ 188 g.
Aluminum chloride _____ 15 g.

The procedure followed in carrying out the reaction and working up the product is substantially the same as that in Example 1, and the product obtained is indistinguishable from that of Example 1.

*Example 8.*—A charge consisting of 2000 pounds of ethylene chloride (20 lb.-mols), 1600 pounds of benzene (20 lb.-mols) and 200 pounds of anhydrous aluminum chloride is heated in a steam-jacketed kettle, with constant stirring. The kettle is connected with a return-flow condenser, and with an absorption train for recovering hydrogen chloride evolved in the reaction. Heat is applied at such a rate that the temperature of the reaction mixture rises gradually and uniformly from 15° C. to 70° C. during 3 to 4 hours, this rate being such as to maintain a moderate rate of reaction within the kettle. The temperature is then maintained at 70° C. until the end of the reaction. After 10 hours at 70° the mixture becomes gelled, whereupon the heating is continued 2 to 3 hours longer at the same temperature, or, alternatively, for 4 to 5 hours at 65° C. The reaction is then quenched by rapidly running about 250 gallons of cold water into the kettle, and the resulting mass is withdrawn from the kettle in the form of a fine moist spongy crumb, is washed successively on corrugated rolls with water, then in an internal mixer with dilute aqueous alkali, and again with water, and is then sheeted out and dried in vacuum pans at about 110° C., for 8 hours. Such drying reduces the moisture content to about 0.2%, and also removes any residual traces of benzol and ethylene dichloride. The crumb becomes a cohesive mass during the first washing. The weight of plastic, elastic product obtained is about 2000 pounds, or about 94% of the theoretical yield.

Physically, the product made as above is identical with the products resulting from the previous examples wherein two or three mols of ethylene dihalide are caused to react with one mol of aromatic hydrocarbon.

In carrying out the process of the invention, substantially all of the aromatic hydrocarbon employed reacts to form the desired products, the yield being 90–95% of the theoretical yield of chlorine-free hydrocarbons.

The above described insoluble products may also be obtained by the further polymerization of similar intermediate products which are less highly polymerized than the ultimate products. Such less highly polymerized intermediate products may be obtained by carrying out the process as illustrated in the above examples, with the modification that the temperature of the reaction mixture is not allowed to rise above 50° C. during the later stages of the reaction: for example, the temperature may be maintained at 40–50° C. during the entire reaction; or the temperature may be 70° C. initially and then allowed to fall to 40–50° C., some time previous to the gelling stage. In either case, the products, unlike those of the above examples, are soluble in the common organic solvents and are somewhat softer than the ultimate insoluble products, but are otherwise very similar to them in their plastic, elastic, and other properties. They are readily converted into the insoluble, more highly polymerized form by heating, for example at as low a temperature as 70° C. Films or coatings may be made from solutions of the soluble products, and may then be made insoluble by moderate heating, as during the drying of the coatings. The preparation of these soluble plastic, elastic compounds is distinctly new and is considered an integral part of the present invention.

The products of this invention, like rubber, are capable of being milled and mixed with fillers and pigments such as for example carbon black, zinc oxide, whiting, clay, and the like. Carbon black acts as a reinforcing agent in much the same way that it does in rubber. Additional strength, rigidity, and toughness may be obtained by intimately mixing the products with fibrous materials such as asbestos fibre, and the resulting mixtures may be hardened by the application of heat at high temperature, for example, at such temperatures as 305° or 337° C. with or without pressure. The products may also be compounded with rubber either by mixing the prepared products with rubber or a mill or by dissolving rubber in the reagents before preparing the new material as shown in Example 3 above. Mixtures of the products with rubber and/or other rubber-like materials may be vulcanized by any of the methods employed for the vulcanization of rubber, for example, by means of sulphur, with or without accelerators and other vulcanizing ingredients.

The products of this invention do not react with sulphur even when heated for one hour at about 164° C., indicating the absence of aliphatic unsaturation. They may, however, be chlorinated to form harder and less flexible materials.

The dry products of the more highly polymerized substances as shown in the examples are substantially unaffected by benezene, toluene, solvent naphtha, gasoline, kerosene, alcohol, acetone, glycerine, paraffine oils, ethylene chloride, carbon tetrachloride, boiling 30% aqueous caustic soda, hydrochloric acid, cold concentrated nitric acid, cold concentrated sulphuric acid, and are therefore eminently suited for the manufacture of organic solvent, oil, alkali and acid-resistant articles. They are attacked very slowly by hot concentrated nitric acid. They are insoluble in but are swelled slightly by ethyl acetate, butyl acetate, aniline and carbon disulphide. They are partially soluble in turpentine by long heating. They are swelled very readily by "drip oils" from gas mains, chloroform, nitrobenzene, pyridine. They are completely dispersed or dissolved by nitrobenzene in the presence of water. The plastic, elastic products of this invention may contain small amounts of oily material which is soluble in and which may be extracted by some of the solvents mentioned above to form colored fluorescent solutions. The oily material is removed by washing the product with water containing a little soap and/or caustic alkali.

The products are infusible but burn slowly in a flame. At low temperatures, for example below 0° C., the products become brittle. The products are easily dispersed in water, xylene, or the like in the presence of emulsifying agents, for example, soaps, casein, sodium hydroxide.

The structure of the products, which comprise mixtures of high molecular weight hydrocarbons, is unknown, but it seems probable, in accordance with modern theories of polymerization, that they comprise extensive chains and/or networks of benzene groups alternating with ethylene groups, each benzene group being linked to at least two ethylene groups. Accordingly the structure of the products of Example 1 would be represented by benzene groups each linked to four ethylene groups, each such ethylene group being further linked to another benzene group likewise linked to three other such ethylene groups, and so forth. Analysis of the product of Example 1 (C, 92.2%; H, 7.8%) indicates a composition corresponding to the predicted empirical formula $(C_{10}H_{10})_n$. The analysis also confirms the absence of unsaturation in the aliphatic groups.

The plastic, elastic products of this invention either alone or mixed with rubber or rubber compounds, fillers, fibrous materials, and other substances are useful in the manufacture of such materials as heat-resisting covers for conveyor belts, and flexible linings for tanks, barrels, ball-mills, pipe lines, and the like, where resistance to abrasion, water, acids, alkalies, organic liquids and heat may be desirable. Mixtures of the products of the invention with rubber in various proportions of from about 25 to 300 parts of the product to 100 parts of rubber (by weight), vulcanized in the usual manner of vulcanizing rubber compositions, provide products having such desirable properties. Such mixtures of the products of the invention with rubber may contain the usual amounts of sulphur based on the rubber content, namely about 2 to 10 parts of sulphur per 100 parts of rubber, to produce a soft-rubber type of vulcanizate, or about 30 to 60 parts of sulphur per 100 parts of rubber, to produce a hard-rubber type of vulcanizate. With the higher proportions of the products of the invention, the hard-rubber types of vulcanizates are characterized by greatly increased flexibility as compared with ordinary ebonite.

It has further been discovered that mixtures of the products of the invention with rubber in the proportions above stated but with amounts of sulphur based on the rubber content between the upper limits of sulphur to produce the soft-rubber types of vulcanizates and the lower limits of sulphur to produce the hard-rubber types of vulcanizates have excellent oil-resistant properties. Mixtures of about 25 to 300 parts of the products of the invention with 100 parts of rubber, vulcanized with about 15 to 25 parts of sulphur per 100 parts of rubber content, and more particularly about 20 parts of sulphur, preferably cured so that substantially all the sulphur is combined, are particularly suitable for flexible oil-resistant stocks in gasoline hose, solvent hose, "Victaulic" rings, oil resistant clothing, as aprons, and the like. Without intention of limiting the invention, a present preferred example of such an oil-resisting stock is included, as follows:

| | Parts by weight |
|---|---|
| Rubber | 100 |
| Product of the invention | 75 |
| Sulphur | 20 |
| Diphenylguanidine | 4 |
| Zinc oxide | 10 |
| Calcium oxide | 10 |
| Magnesium oxide | 20 |
| Carbon black | 30 |
| Anti-oxidant | 1 |

The compound is preferably cured up until all the sulphur is combined, as by heating 75 to 90 minutes at 60 lbs. steam pressure, or by heating about 30 minutes at 80 lbs. steam pressure. If desired the stock without the diphenylguanidine as accelerator may be cured in about 4 hours at 60 lbs. steam pressure. The anti-oxidant used may be an acetone-diphenylamine condensation product, or other well known antioxidant. Smaller amounts of calcium and magnesium oxides may be used. The proportions shown are intended to neutralize any possible traces of acidity that might show up in the product of the invention which would tend to inactivate the diphenylguanidine used as an accelerator. If desired the calcium and magnesium oxides may be omitted entirely, especially if an accelerator having no tendency to be inactivated by acids is added such as mercaptobenzothiazole.

The term "rubber" as used throughout the specification is intended to include various rubber-like materials, natural, or synthetically prepared.

The products may also be used in the manufacture of electrical insulation materials. Tough, non-brittle molded articles may be made. The products of the invention if highly polymerized as shown in the examples, may be dispersed in water or organic liquids such as xylene. If less highly polymerized, that is produced at lower final temperatures than the products of the examples, as described above, they may readily be dissolved in ordinary solvents; such dispersions or solutions may be used as paints and other coating compositions which may be applied to metals, rubber, wood, textiles, paper, etc., by brushing, spreading, dipping, spraying, etc., to produce durable elastic coatings having high resistance to light, weather, heat, water, acids, alkalies, etc.

This application is a continuation-in-part of application Serial No. 571,453, filed October 27, 1931.

Having thus described my invention, what I claim and desire to protect by Letters Patent is:

1. A composition of matter comprising a plastic, elastic reaction product of one molar proportion of an aromatic compound having the general formula $R-C_6H_4-R'$, wherein R and R' each represent hydrogen or a saturated aliphatic hydrocarbon radical containing more than one carbon atom, with about one to three molar proportions of ethylene dihalide.

2. A composition of matter comprising a plastic, elastic reaction product of one molar proportion of an aromatic compound having the general formula $R-C_6H_4-R'$, wherein R and R' each represent hydrogen or a saturated aliphatic hydrocarbon radical containing more than one carbon atom, with about one to three molar proportions of ethylene chloride.

3. A composition of matter comprising a plastic, elastic reaction product of one molar proportion of an aromatic compound having the general formula $R-C_6H_4-R'$, wherein R and R' each represent hydrogen or a saturated aliphatic hydrocarbon radical containing more than one carbon atom, with about one molar proportion of ethylene chloride.

4. A composition of matter comprising a plastic, elastic reaction product of one molar proportion of a mono-nuclear benzene hydrocarbon wherein the number of substituent groups is equal to zero, one or two, said substituent groups being saturated alkyl groups each containing two to four carbon atoms, with about one to three molar proportions of ethylene chloride.

5. A composition of matter comprising a plastic, elastic reaction product of one molar proportion of a mono-nuclear benzene hydrocarbon wherein the number of substituent groups is equal to zero, one or two, said substituent groups being saturated alkyl groups each containing two to four carbon atoms, with about one molar proportion of ethylene chloride.

6. A composition of matter comprising a plastic, elastic reaction product of one molar proportion of benzene with about one to three molar proportions of ethylene chloride.

7. A composition of matter comprising a plastic, elastic reaction product of one molar proportion of benzene with about one molar proportion of ethylene chloride.

8. A heat hardened product comprising a plastic, elastic reaction product of one molar proportion of an aromatic compound having the general formula $R-C_6H_4-R'$, wherein R and R' each represent hydrogen or a saturated aliphatic hydrocarbon radical containing more than one carbon atom, with about one to three molar proportions of ethylene dihalide.

9. As a new product, a dispersion comprising a dispersing medium, a dispersing agent, and dispersed particles of a plastic, elastic reaction product of one molar proportion of an aromatic compound having the general formula $R-C_6H_4-R'$, wherein R and R' each represent hydrogen or a saturated aliphatic hydrocarbon radical containing more than one carbon atom, with about one to three molar proportions of ethylene dihalide.

10. A method of producing a plastic, elastic material comprising reacting one molar proportion of an aromatic compound having the general formula $R-C_6H_4-R'$, wherein R and R' each represent hydrogen or a saturated aliphatic hydrocarbon radical containing more than one carbon atom, with about one to three molar proportions of an ethylene dihalide in the presence of a metal chloride of the class employed in reactions of the Friedel Craft type.

11. A method of producing a plastic, elastic material comprising reacting one molar proportion of an aromatic compound having the general formula $R-C_6H_4-R'$, wherein R and R' each represent hydrogen or a saturated aliphatic hydrocarbon radical containing more than one carbon atom, with about one to three molar proportions of ethylene chloride.

12. A method of producing a plastic, elastic material comprising reacting one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene chloride in the presence of aluminum chloride.

13. A method of producing a plastic, elastic material comprising reacting one molar proportion of an aromatic compound having the general formula R—C₆H₄—R', wherein R and R' each represent hydrogen or a saturated aliphatic hydrocarbon radical containing more than one carbon atom, with about one molar proportion of ethylene chloride.

14. A method of producing a plastic, elastic material comprising reacting one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene dihalide in the presence of up to about one molar proportion of aluminum chloride.

15. A method of producing a plastic, elastic material comprising reacting one molar proportion of a mono-nuclear benzene hydrocarbon wherein the number of substituent groups is equal to zero, one or two, said substituent groups being saturated alkyl groups each containing two to four carbon atoms, with about one to three molar proportions of ethylene chloride, in the present of aluminum chloride.

16. A method of producing a plastic, elastic material comprising reacting one molar proportion of a mono-nuclear benzene hydrocarbon wherein the number of substituent groups is equal to zero, one or two, said substituent groups being saturated alkyl groups each containing two to four carbon atoms, with about one molar proportion of ethylene chloride, in the presence of aluminum chloride.

17. A method of producing a plastic, elastic material comprising providing an admixture of one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene dihalide, and up to about one molar proportion of aluminum chloride, heating the mixture to effect a reaction therebetween, continuing the heating at least until the reaction mixture swells and is converted into a jelly-like mass, and thereafter quenching the reaction with water at such time as to effect the formation of a finely divided, flocculent, spongy mass, and recovering a plastic, elastic material consisting essentially of the product of interaction of about one molar proportion of said aromatic compound and about one to two molar proportions of said ethylene dihalide.

18. A method of producing a plastic, elastic material comprising reacting one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene dihalide, allowing the reaction to proceed until the reaction mixture swells and is converted into a jelly-like mass, and thereafter stopping the reaction.

19. A method of producing a plastic, elastic material comprising reacting one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene chloride, allowing the reaction to proceed until the reaction mixture swells and is converted into a jelly-like mass, and thereafter treating the jelly-like mass with water.

20. A method of producing a plastic, elastic material comprising reacting one molar proportion of an aromatic compound having the general formula R—C₆H₄—R' wherein R and R' each represent hydrogen or a saturated aliphatic hydrocarbon radical containing more than one carbon atom, with about one to three molar proportions of ethylene chloride in the presence of aluminum chloride, allowing the reaction to proceed until the reaction mixture is converted into a jelly-like mass, thereafter disintegrating the jelly-like mass washing the mass, and drying the washed product.

21. A method of producing a plastic, elastic material comprising reacting one molar proportion of benzene with about one to three molar proportions of ethylene chloride in the presence of aluminum chloride, allowing the reaction to proceed until the reaction mixture swells and is converted into a jelly-like mass, and stopping the reaction.

22. As a new product, a reaction product of one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene chloride, which is plastic and elastic and soluble in organic solvents.

23. As a new product, a reaction product of one molar proportion of an aromatic compound having the general formula R—C₆H₄—R', wherein R and R' each represent hydrogen or a saturated aliphatic hydrocarbon radical containing more than one carbon atom, with about one to three molar proportions of ethylene chloride, which is plastic and elastic and polymerized to the state where it is substantially insoluble in organic solvents.

24. As a new product, a reaction product of one molar proportion of a mono-nuclear benzene hydrocarbon, wherein the number of substituent groups is equal to zero, one or two said substituent groups being saturated alkyl groups each containing two to four carbon atoms, with about one to three molar proportions of ethylene chloride, which is plastic and elastic and soluble in organic solvents.

25. As a new product, a reaction product of one molar proportion of a mono-nuclear benzene hydrocarbon, wherein the number of substituent groups is equal to zero, one or two, said substituent groups being saturated alkyl groups each containing two to four carbon atoms, with about one to three molar proportions of ethylene chloride, which is plastic and elastic and polymerized to the state where it is substantially insoluble in organic solvents.

26. As a new product, a reaction product of one molar proportion of benzene with about one to three molar proportions of ethylene chloride, which is plastic and elastic and soluble in organic solvents, and which has the empirical composition $(C_{10}H_{10})_n$.

27. As a new product, a reaction product of one molar proportion of benzene with about one to three molar proportions of ethylene chloride, which is plastic and elastic and polymerized to the state where it is substantially insoluble in organic solvents, and which has the empirical composition $(C_{10}H_{10})_n$.

SEAPHES D. SHINKLE.